(12) United States Patent
Mackert

(10) Patent No.: US 11,857,082 B2
(45) Date of Patent: Jan. 2, 2024

(54) SEATING FURNITURE CHASSIS

(71) Applicant: Innotec Motion GmbH, Lippstadt (DE)

(72) Inventor: Michael Mackert, Rüthen (DE)

(73) Assignee: Innotec Motion GmbH, Lippstadt (DE)

(*) Notice: Subject to any disclaimer, the term of this patent is extended or adjusted under 35 U.S.C. 154(b) by 163 days.

(21) Appl. No.: 17/371,572

(22) Filed: Jul. 9, 2021

(65) Prior Publication Data

US 2021/0330082 A1 Oct. 28, 2021

Related U.S. Application Data

(63) Continuation of application No. PCT/EP2020/050529, filed on Jan. 10, 2020.

(30) Foreign Application Priority Data

Jan. 10, 2019 (DE) .......................... 202019100110.0

(51) Int. Cl.
*A47C 4/02* (2006.01)
*A47C 7/72* (2006.01)
(Continued)

(52) U.S. Cl.
CPC .............. *A47C 4/02* (2013.01); *A47C 1/0242* (2013.01); *A47C 1/03211* (2013.01);
(Continued)

(58) Field of Classification Search
CPC ......... A47C 1/0242; A47C 7/566; A47C 7/58; A47C 7/72; A47C 1/03211; A47C 4/02;
(Continued)

(56) References Cited

U.S. PATENT DOCUMENTS 3,989,298 A * 11/1976 Cycowicz ................ A47C 4/02
297/317
4,061,371 A * 12/1977 Prather ................... E05C 3/045
292/203
(Continued)

FOREIGN PATENT DOCUMENTS

EP 2796074 A1 10/2014
JP 2010018106 A * 1/2010

OTHER PUBLICATIONS 4 page PDF of Written Opinion dated Mar. 17, 2020 for PCT/EP2020/050529. (Year: 2020).*
(Continued)

*Primary Examiner* — Robert Canfield
(74) *Attorney, Agent, or Firm* — Edell, Shapiro & Finnan, LLC

(57) ABSTRACT

A seating furniture chassis comprises a base body, first and second side parts, a back part, a plurality of electrically conductive cables fastened to the base body, and first and second fasteners arranged on the base body. The back part is releasably fastenable to the first fastener and the first and second side parts are respectively releasably fastenable at two opposite sides of the base body to the second fastener, a plurality of individual connectors, and a central connector. Each electrically conductive cable connects one of the individual connectors to the central connector.

20 Claims, 13 Drawing Sheets

(51) Int. Cl.
*B60N 2/68* (2006.01)
*B60R 16/02* (2006.01)
*A47C 1/024* (2006.01)
*A47C 7/56* (2006.01)
*A47C 7/58* (2006.01)
*B60N 2/75* (2018.01)
*B60N 2/02* (2006.01)
*B60N 2/56* (2006.01)
*B64D 11/06* (2006.01)
*A47C 1/032* (2006.01)
*H01B 7/00* (2006.01)

(52) U.S. Cl.
CPC .............. *A47C 4/028* (2013.01); *A47C 7/566* (2013.01); *A47C 7/58* (2013.01); *A47C 7/72* (2013.01); *B60N 2/0228* (2013.01); *B60N 2/5678* (2013.01); *B60N 2/682* (2013.01); *B60N 2/787* (2018.02); *B60R 16/02* (2013.01); *B60R 16/0207* (2013.01); *B60R 16/0215* (2013.01); *B64D 11/0624* (2014.12); *B60N 2002/684* (2013.01); *H01B 7/0045* (2013.01)

(58) Field of Classification Search
CPC .... A47C 4/028; B60N 2/0228; B60N 2/5678; B60N 2/682; B60N 2/787; B60N 2002/684; B60R 16/02; B60R 16/0207; B60R 16/0215; B64D 11/0624; H01B 7/0045
See application file for complete search history.

(56) References Cited

U.S. PATENT DOCUMENTS

| | | | | |
|---|---|---|---|---|
| 4,815,984 A * | 3/1989 | Sugiyama | ........... | B60R 16/0239 296/146.7 |
| 4,890,888 A * | 1/1990 | Kostin | .................... | B60N 2/68 297/440.21 |
| 5,005,908 A * | 4/1991 | Young | .................... | A47C 7/40 24/653 |
| 5,135,284 A * | 8/1992 | Crum | .................... | A47C 7/42 297/440.15 |
| 5,184,871 A * | 2/1993 | LaPointe | .................... | A47C 7/42 403/374.5 |
| 5,265,939 A * | 11/1993 | Self | .................... | A47C 13/005 297/440.13 |
| 5,269,589 A * | 12/1993 | Brothers | .................... | A47C 7/42 297/440.16 |
| 5,483,853 A * | 1/1996 | Moradell | ............. | B60N 2/2231 248/419 |
| 5,890,767 A * | 4/1999 | Chang | .................... | A47C 4/02 297/440.22 |
| 6,011,318 A * | 1/2000 | Mayoras | .............. | B60N 2/7094 361/826 |
| 6,240,779 B1 * | 6/2001 | Kung | .................... | G01P 15/093 73/382 R |
| 6,367,880 B1 * | 4/2002 | Niederman | .......... | A47C 13/005 297/440.16 |
| 6,429,544 B1 * | 8/2002 | Sasaki | .................. | B60N 2/0232 307/10.1 |
| 6,720,671 B2 * | 4/2004 | Kondo | ................... | B60N 2/002 174/72 A |
| 6,752,464 B1 * | 6/2004 | Tseng | ....................... | A47C 7/42 297/440.16 |
| 6,783,182 B1 * | 8/2004 | Gallagher | ................ | A47C 4/02 297/440.22 |
| 7,306,290 B2 * | 12/2007 | Wiecek | ..................... | A47C 7/42 297/440.16 |
| 8,646,843 B2 * | 2/2014 | Koch | ....................... | A47C 4/028 297/440.14 |
| 9,010,851 B2 * | 4/2015 | LaPointe | ............ | A47C 1/03205 297/85 M |
| 9,277,824 B2 * | 3/2016 | Breen | ................. | A47C 1/0355 |
| 9,668,581 B1 * | 6/2017 | Hill | ....................... | A47C 17/04 |
| 9,931,999 B2 * | 4/2018 | Line | ..................... | B60N 2/42709 |
| 9,987,950 B2 * | 6/2018 | Yadav | .................... | H01R 13/73 |
| 10,327,557 B2 * | 6/2019 | Neil | ......................... | A47C 7/02 |
| 11,178,973 B2 * | 11/2021 | Nelson | ................. | A47C 19/005 |
| 11,406,192 B1 * | 8/2022 | Wu | .......................... | A47C 4/02 |
| 2001/0008814 A1 * | 7/2001 | Tsukamoto | .......... | B60R 16/0215 439/502 |
| 2002/0019165 A1 * | 2/2002 | Aoki | .................... | B60R 16/0207 439/502 |
| 2003/0098661 A1 * | 5/2003 | Stewart-Smith | ...... | B60N 2/0248 318/445 |
| 2005/0077774 A1 * | 4/2005 | Schwarz | ................ | B60N 2/686 297/452.18 |
| 2005/0082894 A1 * | 4/2005 | Chi | .......................... | A47C 7/42 297/440.15 |
| 2005/0179303 A1 * | 8/2005 | Owens | ..................... | A47C 7/42 297/440.1 |
| 2010/0027232 A1 * | 2/2010 | Kasuya | ............... | B60R 16/0215 361/807 |
| 2011/0109133 A1 * | 5/2011 | Galbreath | ............ | B60N 2/0232 297/452.48 |
| 2011/0120747 A1 * | 5/2011 | Muneyasu | .......... | B60R 16/0207 174/113 R |
| 2013/0146354 A1 * | 6/2013 | Shimada | ................ | H01B 17/38 174/72 A |
| 2014/0239679 A1 * | 8/2014 | Griggs, Jr. | ................ | A47C 4/02 297/183.1 |
| 2017/0105540 A1 | 4/2017 | Jacobs et al. | | |
| 2017/0143122 A1 * | 5/2017 | Nelson | .................. | A47C 13/005 |
| 2017/0149181 A1 * | 5/2017 | Nelson | .................. | A47C 21/003 |
| 2017/0150264 A1 * | 5/2017 | Nelson | .................. | A61H 23/0236 |
| 2017/0283068 A1 * | 10/2017 | Udriste | ............ | B64D 11/06395 |
| 2018/0041354 A1 * | 2/2018 | Nelson | .................... | A47C 7/727 |
| 2018/0045234 A1 | 2/2018 | Stauss et al. | | |
| 2019/0219083 A1 * | 7/2019 | Selle | ........................ | F16B 12/20 |
| 2020/0091638 A1 * | 3/2020 | Yi | .......................... | H01R 12/714 |
| 2021/0112341 A1 * | 4/2021 | Nelson | .................... | A47C 7/72 |
| 2021/0145184 A1 * | 5/2021 | High, Jr. | .................. | A47C 7/72 |
| 2021/0225555 A1 * | 7/2021 | Mizushita | ........ | H01B 13/01209 |
| 2021/0330086 A1 * | 10/2021 | Mackert | ................ | A47C 7/42 |
| 2021/0330087 A1 * | 10/2021 | Mackert | ................ | F16B 12/26 |
| 2021/0330089 A1 * | 10/2021 | Mackert | ................ | A47C 31/008 |
| 2022/0078555 A1 * | 3/2022 | Nelson | .................. | H04R 1/028 |
| 2022/0104622 A1 * | 4/2022 | Chen | .................. | A47C 7/546 |

OTHER PUBLICATIONS 9 page PDF of translation of JP 2010018106 A. (Year: 2010).*
Search report in corresponding International Patent Application No. PCT/EP2020/050529, dated Mar. 9, 2020.

* cited by examiner

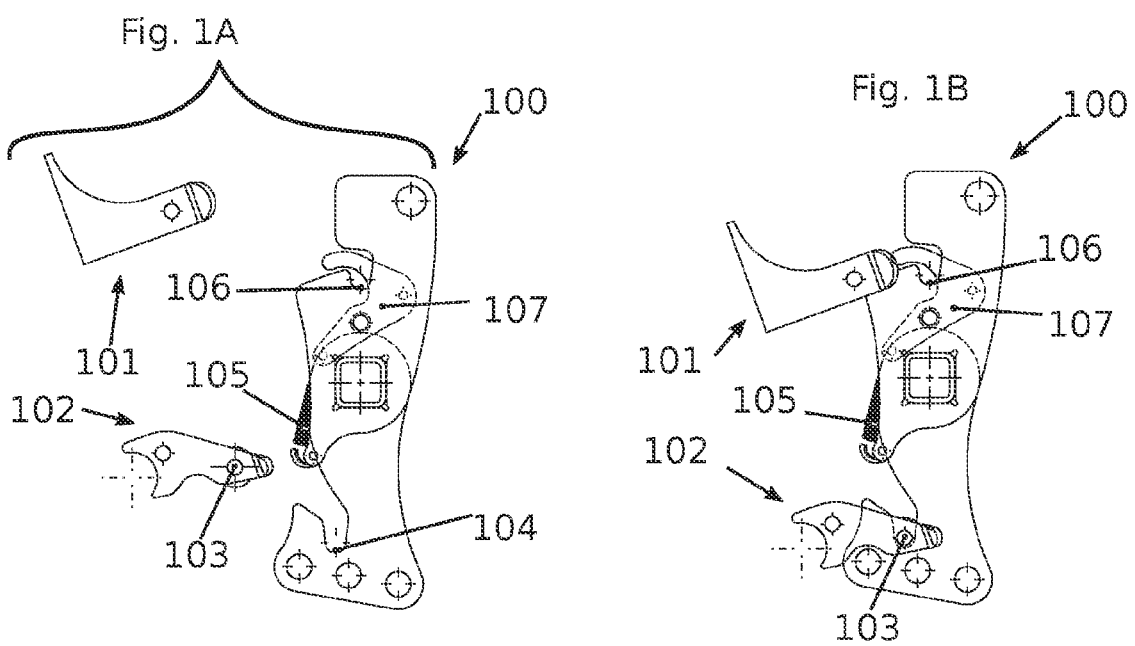

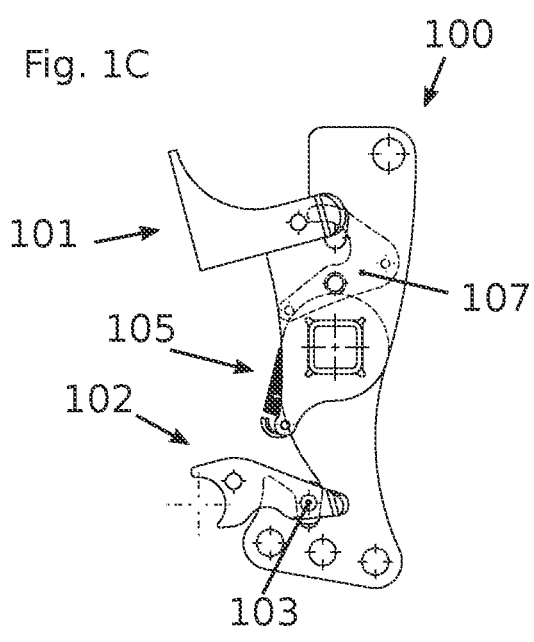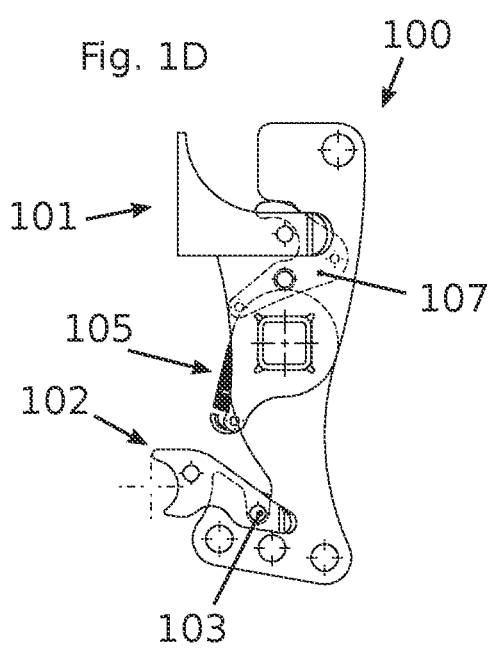

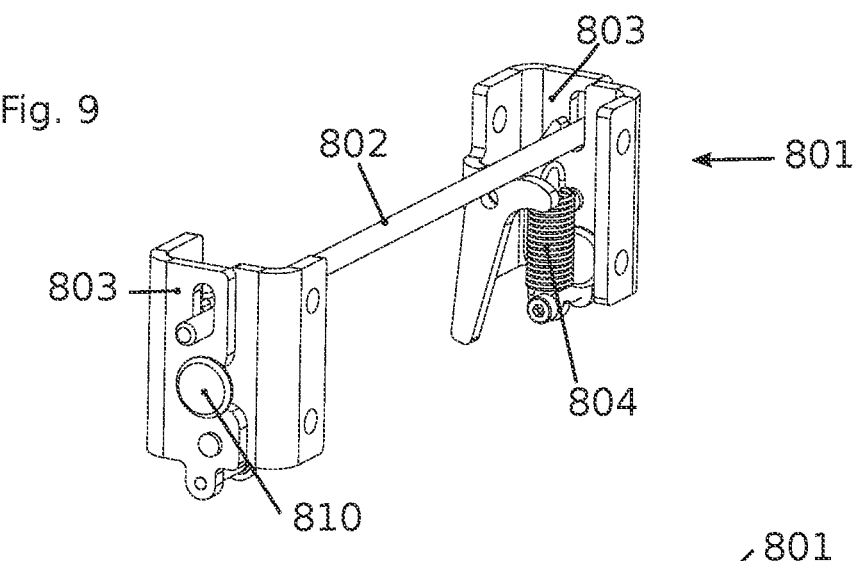
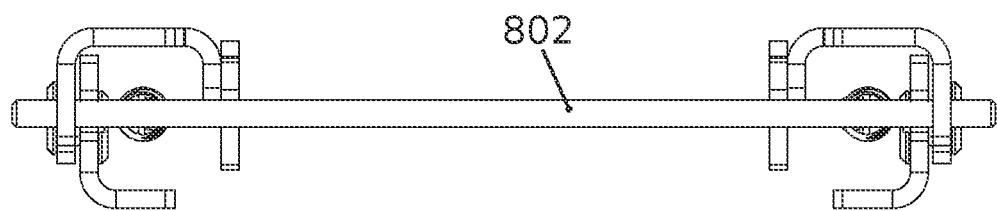

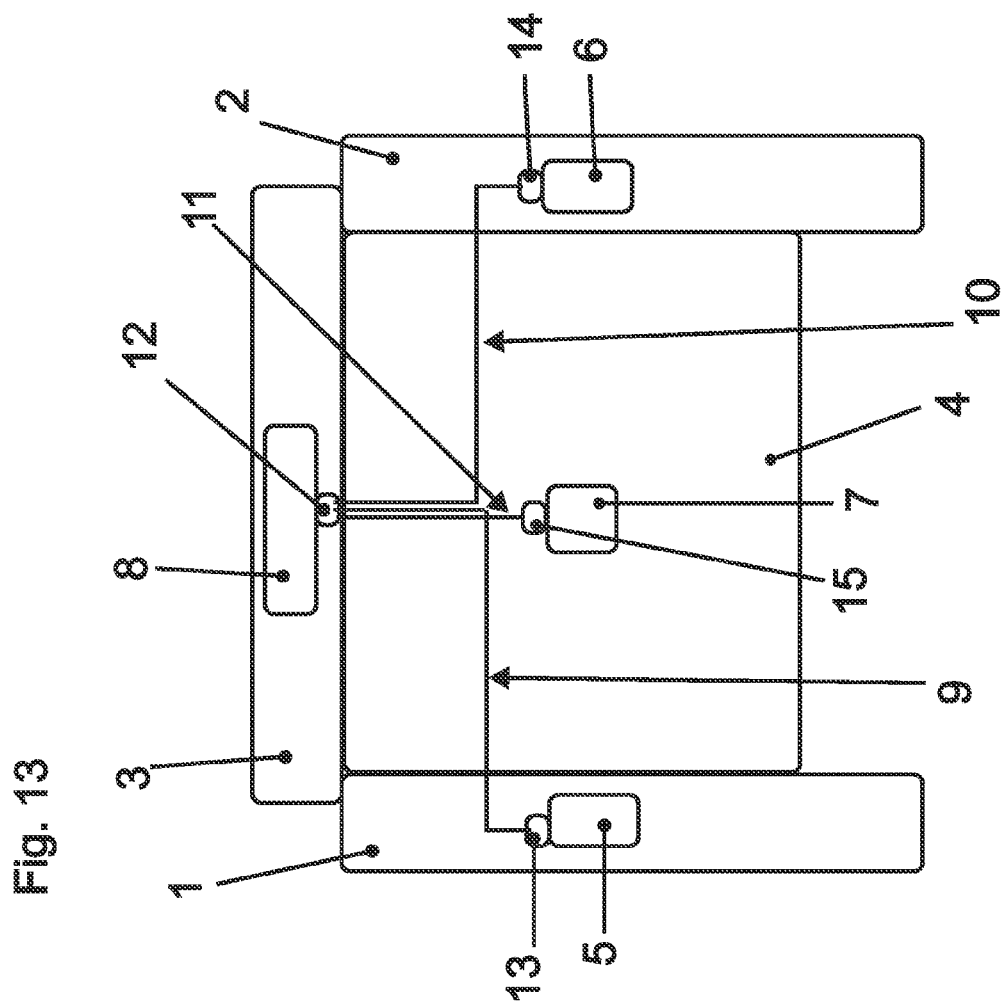

SEATING FURNITURE CHASSIS

This application is a continuation of International Application No. PCT/EP2020/050529, filed on Jan. 10, 2020, which claims priority under 35 U.S.C. § 119 to Application No. DE 202019100110.0 filed on Jan. 10, 2019, the entire contents of which are hereby incorporated by reference.

TECHNICAL FIELD

The present disclosure relates to a seating furniture chassis.

BACKGROUND

Seating furniture chassis having cables are known from the prior art. Operating devices and drive mechanisms are connected to a control unit via the cables, so that the drive mechanisms can be controlled via the operating devices. A seating furniture chassis having a releasably fastenable back part and releasably fastenable side parts is also known from the prior art.

By contrast, the underlying problem addressed by the disclosure is to create a more flexibly adjustable seating furniture chassis. In addition, a method for the assembly of such a seating furniture chassis is to be created.

SUMMARY

The disclosed seating furniture chassis comprises a base body, two side parts, a back part, a plurality of electrically conductive cables, a first fastener, and a second fastener. In the context of this specification, a base body is understood to mean, in particular, a construct that comprises a seat frame and one or more feet with which the seating furniture chassis is erectable on a floor surface. The seat frame can frame a seat. A user can sit on the upholstery after upholstering the seat surface.

In the context of this specification, a back part is understood to mean, in particular, a part that supports a back of a user when the seating furniture chassis is used as intended.

In the context of this specification, a side part is understood to mean, in particular, a part that is attached to the base body laterally. This is understood to mean, in particular, the sides that extend approximately perpendicular to the front and rear of the base body. The front can be the side to which the legs of a user protrude beyond the base body when the seating furniture chassis is used as intended. The rear can be the side at which there is a backrest in the seating furniture chassis.

The first fastener and the second fastener are arranged on the base body. The cables are fastened to the base body. The back part is releasably fastenable to the first fastener. In the context of this specification, a releasable fastening is understood to mean, in particular, that the back part can be fastened to the first fastener intuitively and in a tool-free manner and can also be released from the first fastener in a tool-free manner. It must be ensured that neither the back part nor the first fastener are damaged during the fastening or the release of the fastening.

The removable back part has the particular advantage that the base body can be transported separately from the back part. Therefore, two individual, detached, and less cumbersome objects can be transported instead of a single, large, and cumbersome object. It is also advantageous for the user to be able to fasten the back part to the first fastener at home, because they can thus select a back part that is suitable for them and is not restricted to a specific back part that is already fastened to the base body. An exchange of the back part is also simplified. This is particularly advantageous when a user wishes to use a larger or smaller back part, for example.

In addition, the handling of the seating furniture chassis during production is simplified. Due to health and safety regulations, it may not be permissible in light of the weight for a single worker to carry both the base body and the back part at the same time. Because the back part and the base body can each be carried individually, a single worker can thus transport the entire seating furniture chassis in a tool-free manner.

The side parts are releasably fastenable to the second fastener at two opposite sides of the base body. In the context of this specification, a releasable fastening is understood to mean, in particular, that the side parts can be fastened to the second fastener in a tool-free manner and can also be released again from the second fastener in a tool-free manner. It must be ensured that neither the side parts nor the second fastener are damaged during the fastening or the release of the fastening.

The removable side parts have the particular advantage that the base body can be transported separately from the side parts. Therefore, three individual, detached, and less cumbersome objects can be transported instead of a single, large, and cumbersome object. It is also advantageous for the user to be able to fasten the side parts to the second fastener at home, because they can thus select side parts that are suitable for them and is not restricted to specific side parts that are already fastened to the base body. An exchange of the back part is also simplified.

In addition, the handling of the seating furniture chassis during production is simplified. Due to health and safety regulations, it may not be permissible in light of the weight for a single worker to carry both the base body and the side parts at the same time. Because the side parts and the base body can each be carried individually, a single worker can thus transport the entire seating furniture chassis in a tool-free manner.

The seating furniture chassis comprises a plurality of individual connectors and a central connector. The cables each connect one of the individual connectors to the central connector. In particular, it is possible for the seating furniture chassis to comprise exactly one single central connector. In the context of this specification, the central connector is understood to mean, in particular, a plug or a socket. In the context of this specification, an individual connector is understood to mean, in particular, a plug or a socket.

Due to the connection of the cables to the central connector, for example, a control unit can be connected to the cables in a particularly simple manner by plugging the central connector into the control unit. An exchange or retrofitting of the control unit is therefore particularly simple.

It is possible, for example, for the cables to always be arranged on the seating furniture chassis, regardless of whether the seating furniture chassis is equipped with electrical devices or not. If, for example, a user acquires a piece of seating furniture with a seating furniture chassis that they have purchased without electrical devices, they can simply acquire and retrofit the electrical devices and the control unit after the fact according to their requirements by connecting the cables to the subsequently purchased devices and the control unit. Due to the use of the central connector, the effort on the part of the user is particularly low. In addition, the cabling is already fastened to the seating furniture chassis, so that the risk of incorrect cabling is reduced.

According to a disclosed embodiment, the side parts can each comprise an armrest. In the context of this specification, an armrest is understood to mean, in particular, a component designed in order to serve as an arm support for a user sitting on the seating furniture chassis. It is also possible for the armrest to be upholstered and, in the upholstered state, designed in order to serve as an arm support for a user sitting on the seating furniture chassis.

According to a disclosed embodiment, the back part can comprise a backrest. In this context, a backrest is understood to be an area that, after the application of upholstery by a user, can be used in order to rest their back when the seating furniture chassis is used as intended.

According to a disclosed embodiment, a first of the cables can be arranged such that the individual connector connected to the first cable protrudes in the direction of a first of the side parts. Therefore, this cable can already be positioned such that it is particularly suitable for connecting an operating device arranged in the side part. This simplifies the connection of the operating device to the cable.

According to an embodiment, the first side part can comprise a first peripheral electrical device, which comprises a first peripheral connector. The first peripheral connector can be electrically connectable to the individual connector of the first cable. Thus, using the cable, the first peripheral electrical device can be connected to another electrical device. This embodiment is particularly advantageous when the first cable protrudes in the direction of the first side part. The connection of the first peripheral electrical device to the first cable is then particularly simple.

The first cable can be arranged, for example, such that it protrudes into a receiving space for the first peripheral electrical device to be connected to the first cable. In this case, it is immediately clear to the user that they must connect the first cable to the first peripheral electrical device.

It is also possible for the first cable and/or the individual connector connected to the first cable and the first peripheral electrical device to have the same color, so that a user can easily discern that he or she must connect the first cable to the first peripheral electrical device.

According to a disclosed embodiment, the first peripheral electrical device can be designed as a first operating device. In the context of this specification, an operating device is understood to mean, in particular, a device that enables inputs by a user, for example via buttons, knobs, and/or controllers.

According to a disclosed embodiment, a second of the cables can be arranged such that the individual connector connected to the second cable protrudes in the direction of a second of the side parts.

According to a disclosed embodiment, the second side part can comprise a second peripheral electrical device, which comprises a second peripheral connector. The second peripheral connector can be electrically connectable to the individual connector of the second cable. Therefore, it is also enabled that a second peripheral electrical device can be simply and conveniently connected to the matching second cable in the second side part.

According to a disclosed embodiment, the second peripheral electrical device can be designed as a second operating device. This enables operation on both sides. For example, the first and the second operating device can be designed for different functions of the seating furniture chassis.

According to a disclosed embodiment, the base body can have a seat frame and a free space arranged below the seat frame. The term "below" in the context of this specification is understood to mean that the relevant component is arranged below when the seating furniture chassis is used as intended. A third of the cables can be arranged below the seat frame so that it protrudes in the direction of the free space. This is particularly advantageous in order to be able to connect an electrical device arranged in the free space to the third cable in a particularly simple manner.

According to a disclosed embodiment, the seating furniture chassis can comprise a third peripheral electrical device. The third peripheral electrical device can be arranged in the free space and can comprise a third peripheral connector, which can be electrically connectable to the individual connector of the third cable.

According to a disclosed embodiment, the third peripheral electrical device can be designed as a drive mechanism, for example as an electric motor for adjusting the backrest, the seat, or a foot and/or leg support. The seating furniture chassis can also comprise further drive mechanism, so that, for example, a drive mechanism is provided for the adjustment of the backrest, the adjustment of the seat, and the adjustment of the foot and/or leg support, respectively.

According to a disclosed embodiment, the central connector can be arranged such that it protrudes in the direction of the back part. In this manner, the connection of an electrical device arranged in this area to the peripheral electrical devices is simplified.

According to a disclosed embodiment, the back part can comprise a central electrical device, which comprises a connector that is connectable to the central connector. The central electrical device can be arranged, for example, below the backrest.

According to a disclosed embodiment, the central electrical device can be designed as a control unit.

According to a disclosed embodiment, the central electrical device can be designed in order to receive first signals from the first peripheral electrical device and/or from the second peripheral electrical device. These signals can be used, for example, in order to control the third peripheral electrical device.

According to a disclosed embodiment, the central electrical device can be designed in order to emit second signals to the third electrical peripheral device as a function of the first signals. This enables the third electrical peripheral device to be controlled as a function of signals that a user has caused and have been received via the first two electrical peripheral devices. The user can thus control the third electrical peripheral device.

As a result of the cabling and the use of the central connector, the seating furniture chassis can thus be expanded in a particularly simple manner with peripheral electrical devices. The exchangeability of peripheral electrical devices is also simplified.

According to a disclosed embodiment, the back part can be fastenable to the first fastener with a pivoting movement. This is particularly convenient for a user in order to fasten the back part.

According to a disclosed embodiment, the side parts can each be fastenable to the second fastener with a pivoting movement. This is particularly convenient for a user.

According to a disclosed embodiment, the first fastener can comprise a first spring element and a first fastening element. The first spring element can exert a first spring force on the fastening element. Upon fastening of the back part to the first fastener, the first fastening element can be moved by the back part counter to the first spring force. In the context of this specification, fastening is understood to mean, in particular, the process of fastening the back part to the base body. In this manner, the back part can be fastened to the first fastener by utilizing the first spring force and can be released again by overcoming the first spring force.

According to a disclosed embodiment, the first fastener can have a latching area. The back part can comprise a latching element. The latching element can be arranged in the latching area in the fastened state of the back part on the fastener.

According to a disclosed embodiment, the first fastening element, triggered by the first spring force, can exert a latching force on the latching element when the latching element is arranged in the latching area. For example, the first spring element can be fastened in a first end area on the first fastening element, whereby a second end area of the first fastening element, which is arranged opposite the first end area, can exert the latching force on the latching element. In this case, due to the first spring force, a torque acts on the first fastening element, which in turn causes the latching force.

According to a disclosed embodiment, the latching element can be designed in order to trigger the movement of the first fastening element counter to the first spring force. For example, upon fastening of the back part to the first fastener, the latching element can come into contact with the first fastening element and thus trigger the movement.

According to a disclosed embodiment, the second fastener can comprise a second spring element and a second fastening element. The second spring element can exert a second spring force on the second fastening element. Upon fastening of one of the side parts to the second fastener, the second fastening element is moved counter to the second spring force. In the context of this specification, fastening is understood to mean, in particular, the process of fastening the side part to the base body. In this manner, the side part can be fastened to the second fastener by utilizing the second spring force and can be released again by overcoming the second spring force.

According to a disclosed embodiment, the side parts can each comprise a receiving area. In the fastened state of the side parts on the second fastener, the second fastening element can be arranged in the receiving area and can be held in the receiving area by the second spring force.

The back part can be releasably fastened to the first fastener and the side parts to the second fastener. In addition, an electrical connection is established between the central electrical device and the peripheral electrical device(s) in that the central connector is/are connected to the central electrical device and the individual connector(s) is/are connected to the peripheral electrical device(s).

BRIEF DESCRIPTION OF THE DRAWINGS

Further features and advantages of the disclosed furniture seat chassis will become apparent from the following description of preferred exemplary embodiments with reference to the attached drawings. The same reference numerals are used for the same or similar components as well as for components having the same or similar functions. The figures show:

FIGS. 1A-1D are four lateral views of a fastener according to an embodiment and parts of a back part;

FIG. 9 is a schematic perspective view of a fastener of a seating furniture chassis according to a disclosed embodiment;

FIG. 10 is a schematic plan view of the fastener shown in FIG. 9;

FIG. 13 is a schematic top view of a seating furniture chassis according to an embodiment of the invention.

DETAILED DESCRIPTION

Figure 2:
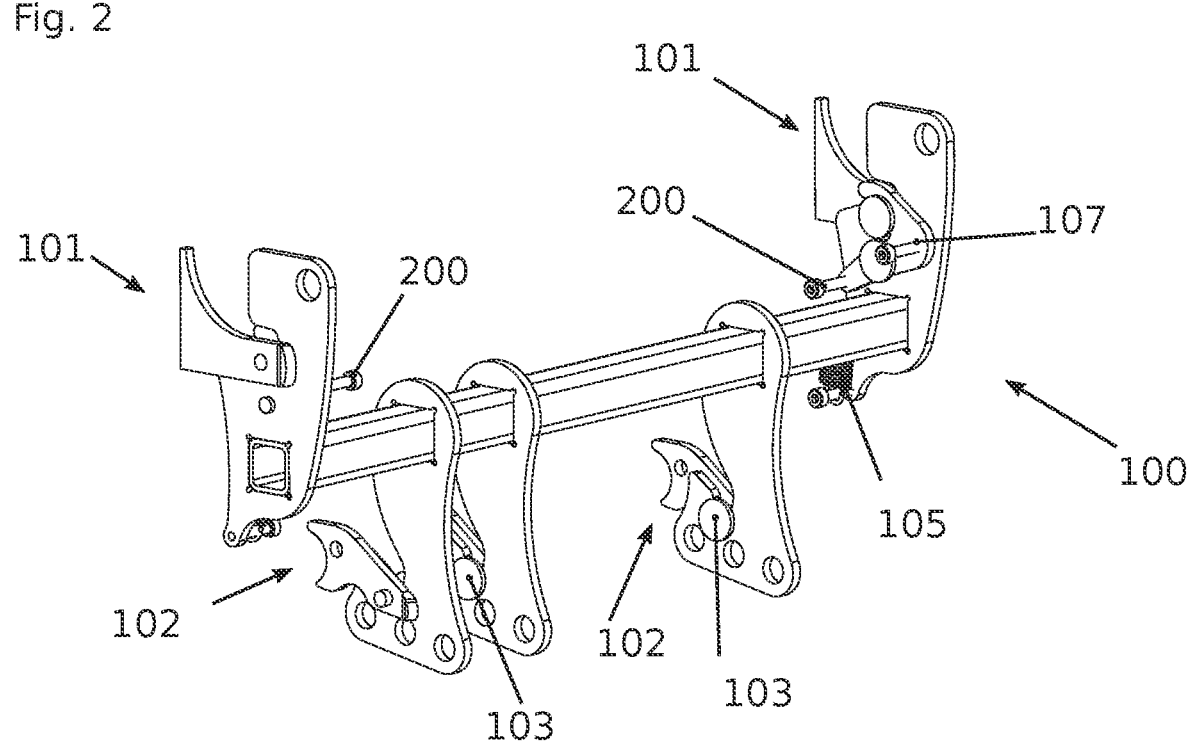
FIG. 2 is a schematic perspective view of the fastener shown in FIG. 1.

A first fastener 100 is arranged on a base body of a seating furniture chassis, not shown in FIGS. 1A to 1D. A back part can be fastened to the first fastener 100. For this purpose, the back part has a latching element 101 and a positioning element 102. The positioning element 102 in turn comprises a bolt 103. The first fastener 100 comprises a positioning area 104, a first spring element 105, a latching area 106, and a first fastening element 107.

The first spring element 105 is connected to the first fastening element 107 and exerts a first spring force on the first fastening element 107. The first fastening element 107 is pivotable about a first pivot axis.

In FIGS. 1A to 1D, the fastening process of the back part to the first fastener 100 is shown in chronological order. At first—as shown in FIG. 1A—the back part and the first fastener 100 are separate from one another. Using the positioning element 102, a connection is then established between the first fastener 100 and the back part. The bolt 103 is inserted into the positioning area 104. For this purpose, it is advantageous for the outer shape of the bolt 103 to be adapted to the shape of the positioning area 104. In addition, the bolt 103 and the positioning area 104 can have the same color, so that assembly is simplified for a user, because the same color indicates to the user that these two components must be connected to one another. The bolt 103 thus defines a second pivot axis, about which the back part is pivotable. This state is shown in FIG. 1B.

In order to simplify the insertion of the bolt 103 into the positioning area 104, the positioning element 102 has a slope over which the positioning element 102 can glide, so that the bolt 103 is inserted into the positioning area 104.

The back part is then pivoted about the second pivot axis. In so doing, the latching element 101 comes into contact with the first fastening element 107 and pivots about the first pivot axis counter to the first spring force. Here, it is advantageous for the latching element 101 to have a slope on the side facing the first fastening element 107 during the fastening process, so that an insertion is simplified. This state is shown in FIG. 1C.

When the pivoting movement of the back part about the second pivot axis is continued, the latching element 101 arrives in the latching area 106. For this purpose, it is advantageous for the outer shape of a section of the latching element 101 to be adapted to the shape of the latching area 106. In this position, the first fastening element 107 exerts a latching force on the latching element 101, the force being caused by the first spring element 105. In this manner, the latching element 101 is held securely in the latching area 106. This state is shown in FIG. 1D.

FIG. 2 shows the first fastener 100, wherein the back part is fastened to the first fastener 100. This state therefore corresponds to the state shown in FIG. 1D. FIG. 2 further shows that the first fastener 100 comprises two first fastening elements 107. The back part comprises a plurality of positioning elements 102. The first fastener 100 comprises a corresponding number of positioning areas. FIG. 2 also shows two spring fasteners 200, to each of which one of the first spring elements 105 is fastened in order to exert the first spring force on the respective first fastening element 107.

Figure 3:
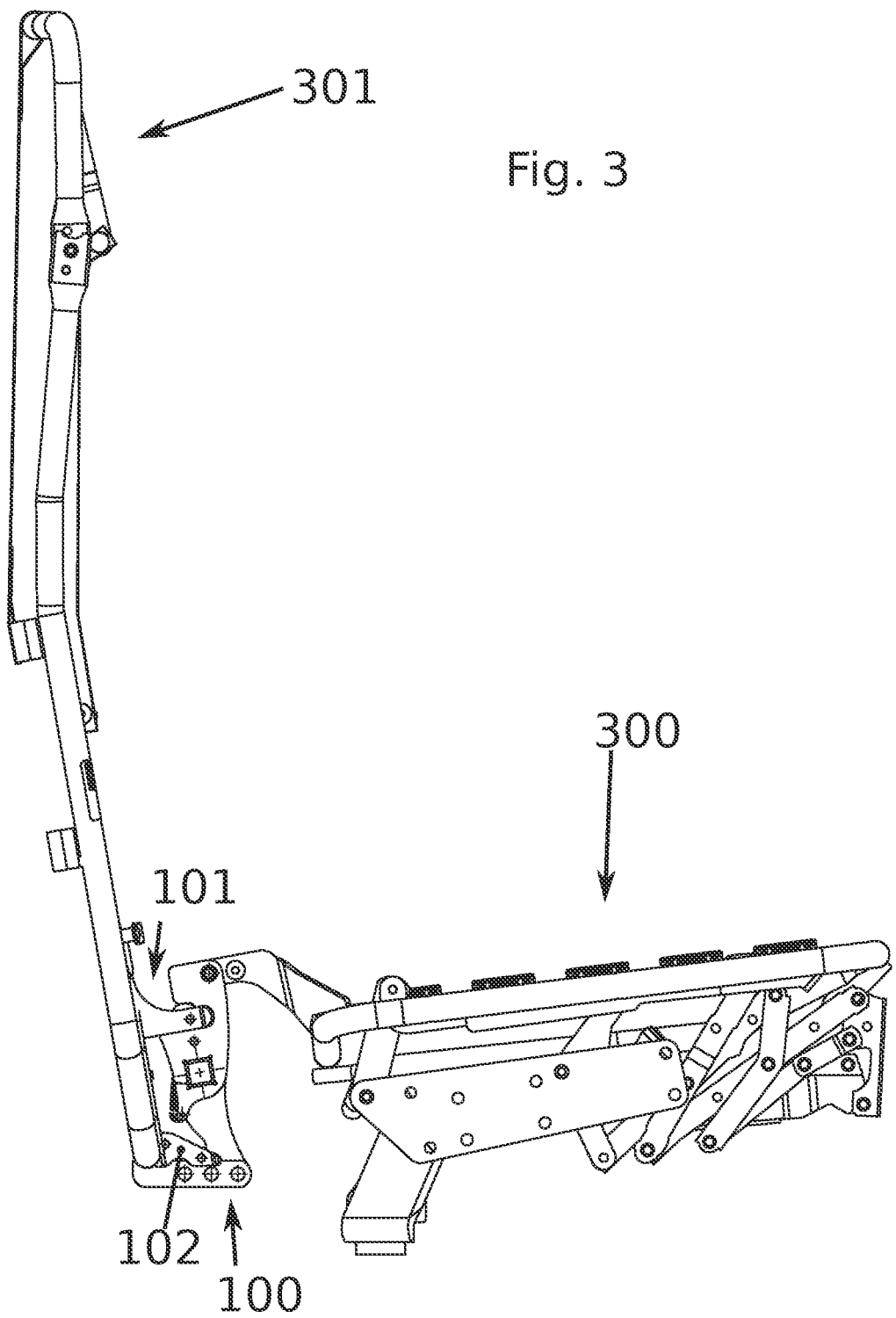
FIG. 3 is a schematic lateral view of a seating furniture chassis according to a disclosed embodiment with a base body and a back part fastened to the base body.

The seating furniture chassis shown in FIG. 3 comprises a base body 300 with a seat frame, the first fastener 100 arranged on the base body 300, and a back part 301 fastened to the first fastener 100. The back part 301 comprises the positioning element 102 and the latching element 101. The back part 301 is fastened to the first fastener 100 with the latching element 101 and the positioning element 102.

Figure 4:
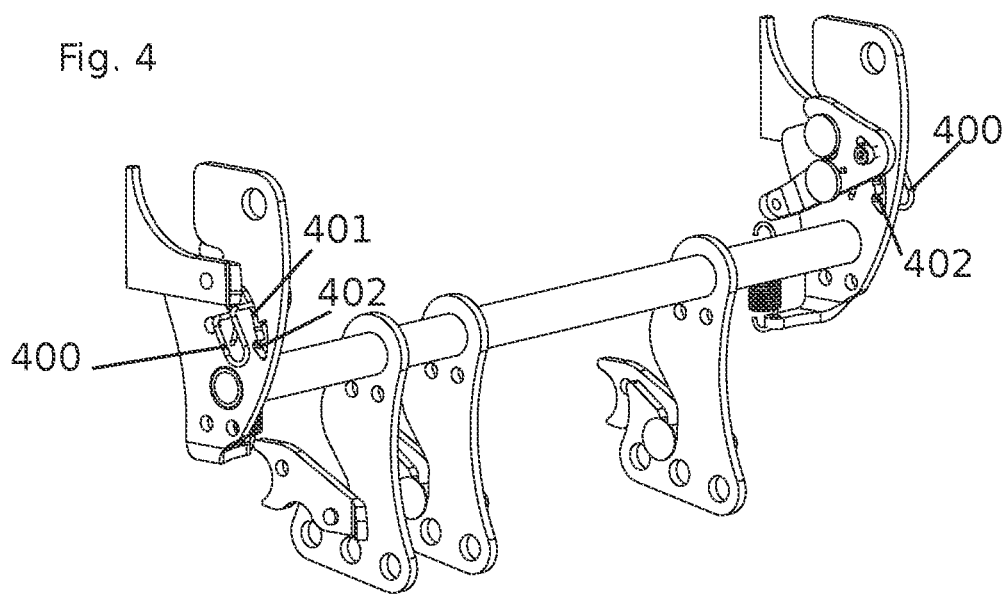
FIG. 4 is a schematic perspective view of a fastener according to a disclosed embodiment.

The embodiment shown in FIG. 4 differs from the embodiment in FIG. 2 in particular in that the first fastening element 107 comprises a spring mechanism 400, which is guided in a guiding mechanism 401 and is latchable into a latching mechanism 402.

Figure 5:
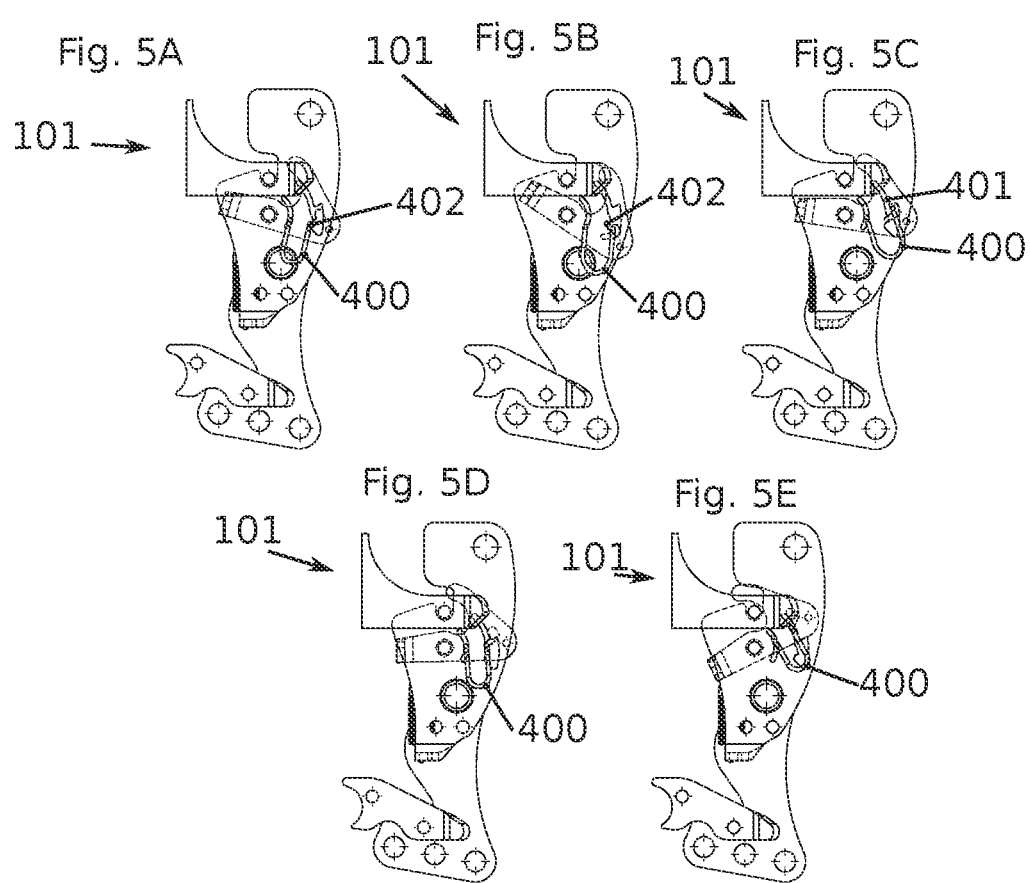
FIG. 5A-5E are multiple schematic lateral views of the embodiment shown in FIG. 4.

The function of the embodiment from FIG. 4 can be understood using FIGS. 5A to 5E. When the latching element 101 is to be released from the first fastener 100, the first fastening element 107 is pivoted such that the latching element 101 is released. In this state, the latching element 101 no longer exerts any force on the first fastening element 107. During the pivoting of the fastening element 107, the spring mechanism 400 is guided in the guiding mechanism 401 and latches into the latching mechanism 402 such that the first fastening element 107 is no longer automatically moved back. This state is shown in FIG. 5A.

The back part can now be removed. Subsequently, the spring mechanism 400 can be elastically deformed such that it is moved out of the latching mechanism 402 (FIG. 5B). It is pivoted back by the spring force of the first spring element 105 (FIG. 5C) and arrives at a stop. The spring mechanism 400 can then be deformed back again such that it arrives in the guiding mechanism 401. The first fastening element 107 is then pivoted back further so that it is again suitable for fastening of the latching element 101.

Figure 6:
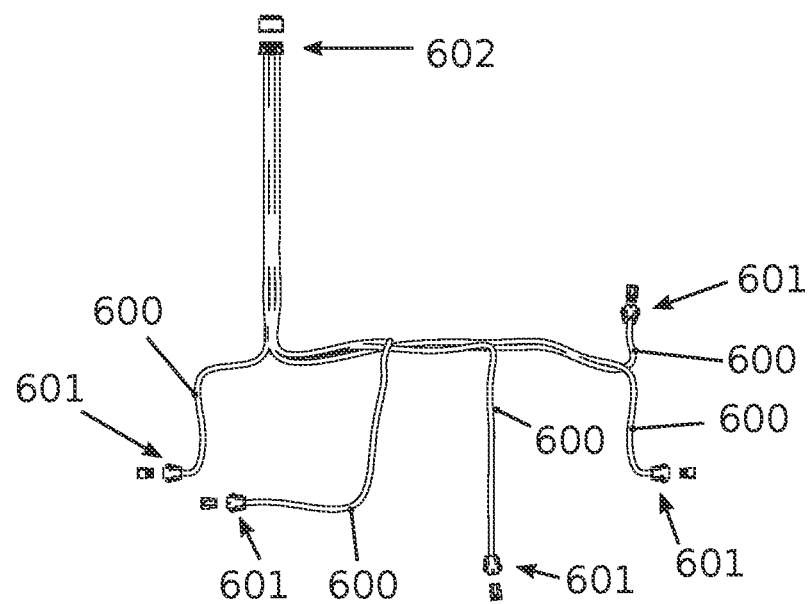
FIG. 6 is a schematic perspective view of a plurality of cables for use in a seating furniture chassis according to a disclosed embodiment.

The cables 600 shown in FIG. 6 are each connected at a first end to a single plug 601, which can be plugged into a socket. It would also be possible to connect the cables 600 to a socket, into which a plug can be inserted. The cables 600 are also connected at their second end to a central plug 602, which can be plugged into a socket. It would also be possible to connect the cables to a central socket, into which a plug can be inserted.

Due to the use of the central plug 602, a central electrical device can be electrically connected to the cables in a particularly simple manner, so that the central electrical device can be connected after the fact, for example by a user. In addition, the use of the central plug 602 reduces the risk of incorrect contacting.

Figure 7:
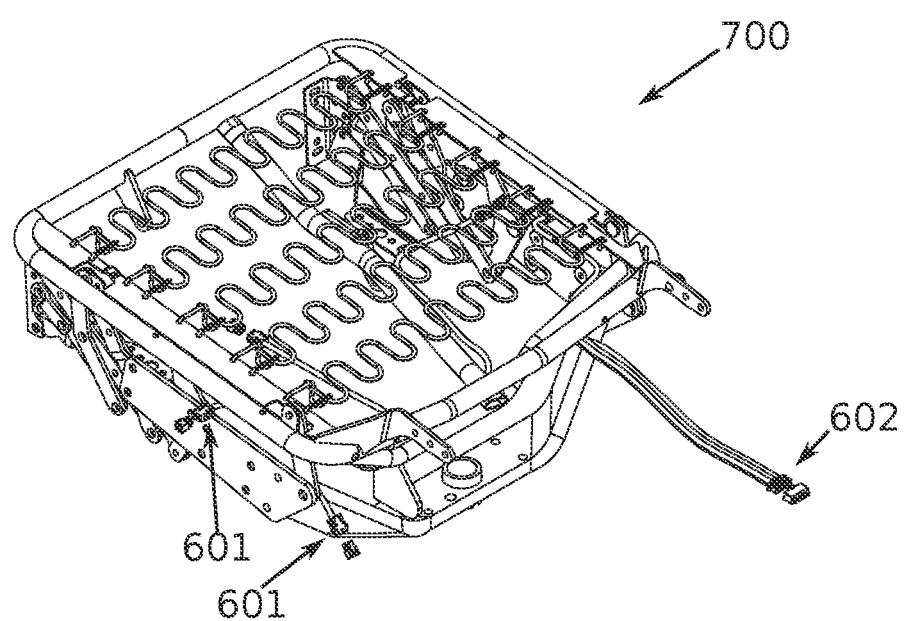
FIG. 7 is a schematic perspective view of a seating furniture chassis according to a disclosed embodiment.

FIG. 7 shows that the cables 600 are fastened to the base body 700 of the seating furniture chassis. Here, the plugs 601 are arranged such that they can be connected in a particularly simple manner to electrical peripheral devices, such as a motor or an operating device. Due to this arrangement, it is particularly simple for a user to correctly electrically connect the peripheral electrical device to the central electrical device.

If, for example, a back part with a central electrical device is to be connected to the base body 700, this can be done simply by making contact with the central plug 602. This is particularly advantageous in combination with the particularly simple exchangeable back part shown in FIGS. 1 to 5. Retrofitting with the central electrical device is also particularly simple.

In case of a retrofitting of the side parts of the seating furniture chassis, the plugs 601 can be used in a particularly simple manner for the electrical connection to peripheral electrical devices. This is particularly advantageous in combination with the exchangeability of the side parts described below.

Figure 8A:
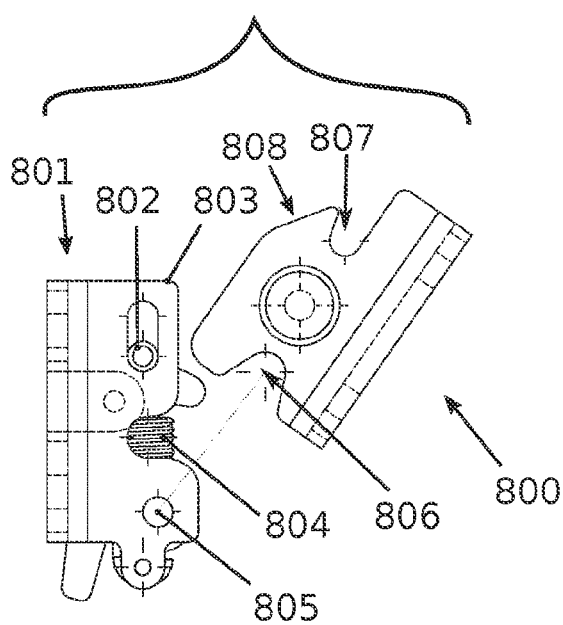
FIGS. 8A-8E are schematic lateral views of the process of fastening of a side part to a fastener in a seating furniture chassis according to a disclosed embodiment.
Figure 8B:
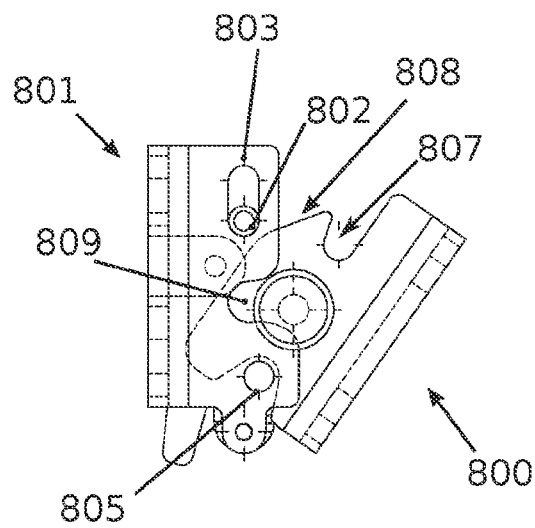
Figure 8C:
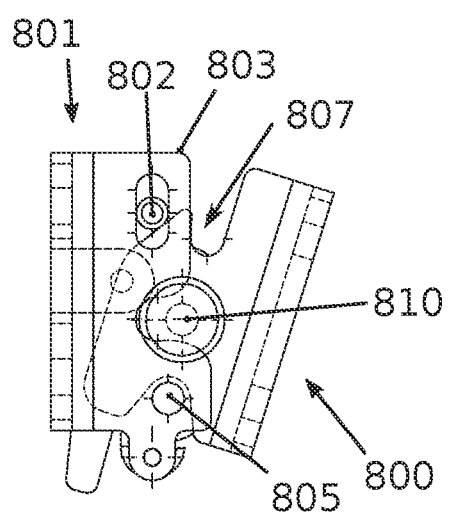

FIGS. 8A to 8D show only a section of the side part 800. This is the section with which the side part 800 is fastened to the second fastener 801. FIG. 8E shows an enlargement of the section labeled D in FIG. 8D.

The second fastener 801 comprises a second fastening element 802, a guiding element 803, a second spring element 804, and a support element 805. The side part 800 has a support area 806, a receiving area 807, a glide surface 808, and a clamping mechanism 809. The second spring element 804 exerts a second spring force on the second fastening element 802, such that the second fastening element 802 is held in the first position shown in FIG. 8A.

In order to fasten the side part 800 to the second fastener 801, the support area 806 is initially placed on the support element 805. In order to facilitate assembly for a user, the support element 805 and the support area 806 can be designed in the same color. It can thus be made clear to the user in a simple manner that these two components must be connected to one another. This state is shown in FIG. 8B. The side part 800 is then pivoted about a pivot axis, which is defined by the support element 805. During this pivoting movement, the glide surface 808 comes into contact with the second fastening element 802 and moves it counter to the second spring force. During this movement, the second fastening element 802 is guided in an elongated hole in the guide element 803. This state is shown in FIG. 8C.

During the pivoting movement, a protrusion 810 of the side part 800, for example a bolt or a rivet, engages with a recess 809 on the second fastener 801. The projection 810 and the recess 809 form a positive-fit connection in a vertical direction. A vertical movement of the side part 800 relative to the second fastener 801 is thus limited or prevented.

Figure 8D:
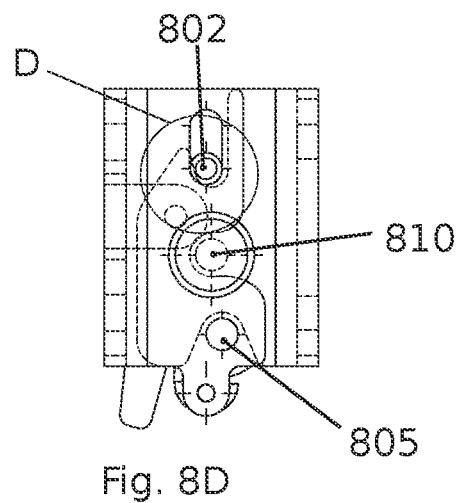
Figure 8E:
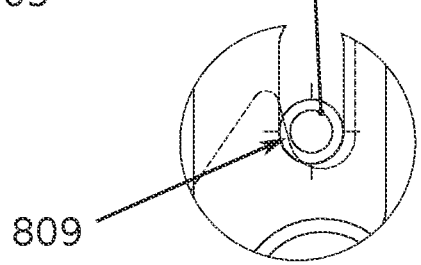

FIG. 8D shows how the side part 800 is fastened to the second fastener 801. The second fastening element 802 is again in the first position and is held there by the second spring force. In addition, the clamping mechanism 809 exerts a clamping force on the second fastening element 802 in this position, such that a particularly good fastening is achieved, and mechanical play of the second fastening element 802 in the first position is reduced.

Figure 11:
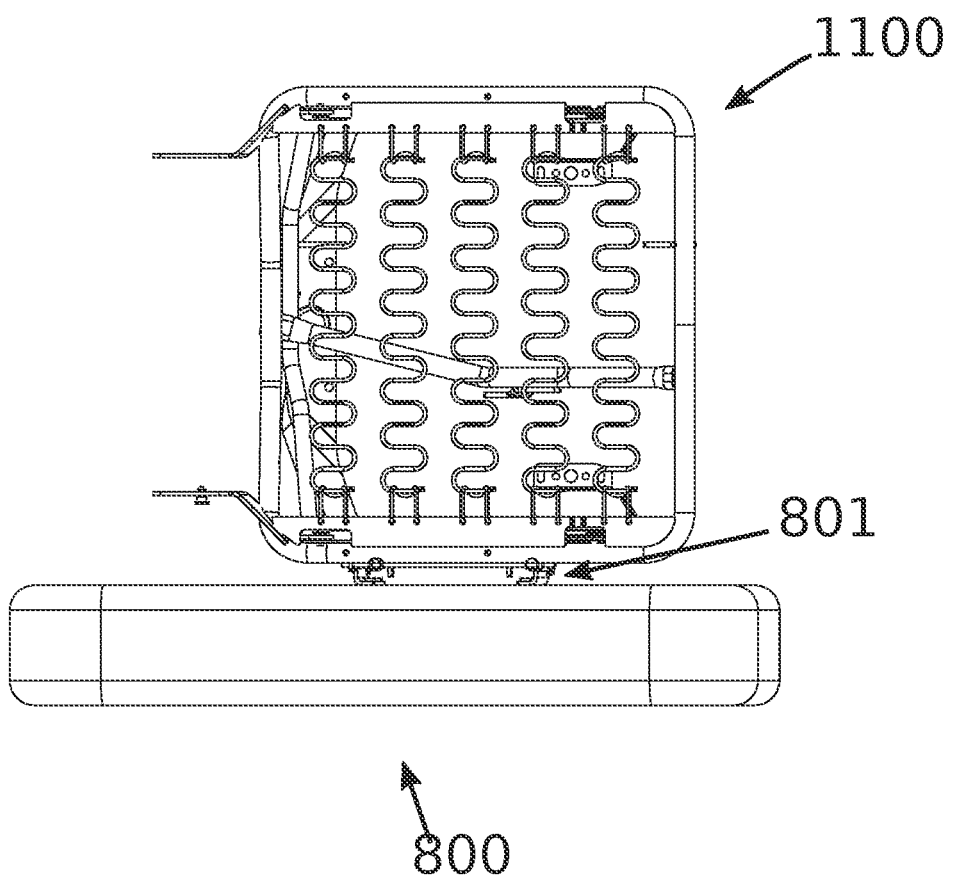
FIG. 11 is a schematic plan view of a seating furniture chassis according to a disclosed embodiment.
Figure 12:
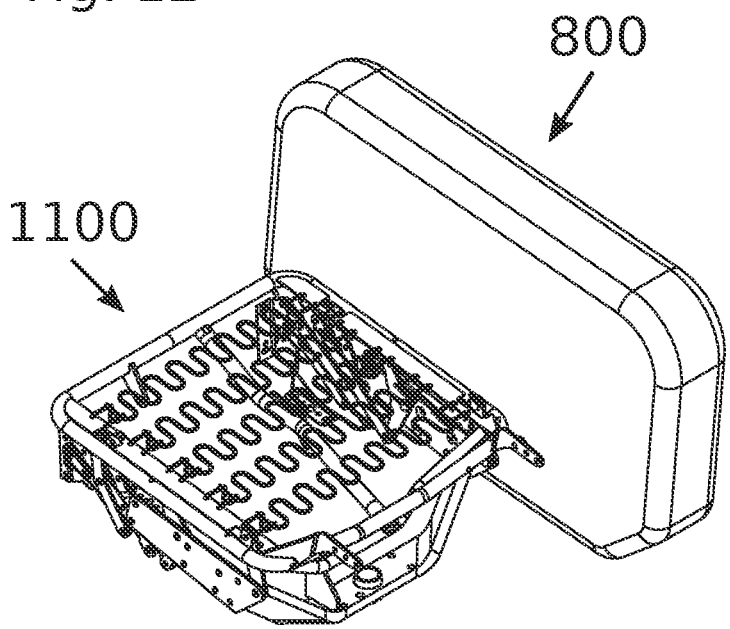
FIG. 12 is a schematic perspective view of the seating furniture chassis shown in FIG. 11.

FIGS. 11 and 12 show that the seating furniture chassis has a seat frame 1100 on which the second fastener 801 is arranged. The side part 800 is thus fastened to the seat frame 1100 laterally.

Referring now to FIG. 13, an example embodiment of a seating furniture chassis according to the present invention is depicted and will now be described.

As shown in FIG. 13, the seating furniture chassis comprises a first side part 1, a second side part 2, a back part 3, and a seat frame 4. The first side part includes a first peripheral electrical device 5 and the second side part includes a second peripheral electrical device 6. As described herein, the first and second electrical devices may be designed as first and second operating devices, respectively, for different functions of the seating furniture chassis.

The seating furniture chassis can also comprise a third peripheral electrical device 7 which can be arranged in a free space below the seat frame 4. The third peripheral electrical device can be, for example, a drive mechanism for adjusting the back part 3 (e.g., a backrest). The back part of the seating furniture chassis can include a central electrical device 8 which can be arranged below the backrest. The central electrical device may be arranged as a control unit.

Again referring to FIG. 13, the seating furniture chassis further comprises a first cable 9, a second cable 10, a third cable 11, and a central connector 12. As shown, the first cable 9 can be arranged to protrude in the direction of the first side part 1, the second cable can be arranged to protrude in the direction of the second side part 2, the third cable 11 can be arranged to protrude in the direction of the free space below the seat frame 4, and the central connector 12 can be arranged such that it protrudes in the direction of the back part 3. The central connector 12 may be a plug or a socket.

As further depicted, the seating furniture chassis comprises a plurality of individual connectors 13, 14, and 15. Each individual connector may be a plug or a socket. The first cable 9 is connectable to individual connector 13, the second cable 10 is connectable to individual connector 14, and the third cable 11 is connectable to the central connector 12. The cables each connect one of the individual connectors 13, 14, 15 to the central connector 12.

What is claimed is:

1. A seating furniture chassis, comprising:
    a base body;
    first and second side parts;
    a back part;
    a plurality of electrically conductive cables fastened to the base body;
    first and second fasteners arranged on the base body, wherein the back part is releasably fastenable to the first fastener and the first and second side parts are respectively releasably fastenable at two opposite sides of the base body to the second fastener; and
    a plurality of individual connectors and a central connector,
    wherein the base body has a seat frame and a free space arranged below the seat frame,
    wherein the back part comprises a central electrical device comprising a connector that is connectable to the central connector,
    wherein the central electrical device comprises a control unit,
    wherein the electrically conductive cables each connect one of the individual connectors to the central connector,
    wherein a first of the cables is arranged such that the individual connector connected to the first of the cables protrudes in a direction of the first side part,
    wherein a second of the cables is arranged such that the individual connector connected to the second of the cables protrudes in a direction of the second side part,
    wherein a third of the cables is arranged below the seat frame such that the third cable protrudes in a direction of the free space, and
    wherein the central connector is arranged to protrude in a direction of the back part.

2. The seating furniture chassis of claim 1, wherein the first and second side parts each comprise an armrest.

3. The seating furniture chassis of claim 1, wherein the back part comprises a backrest.

4. The seating furniture chassis of claim 1, wherein the first side part comprises a first peripheral electrical device comprising a first peripheral connector that is electrically connectable to the individual connector of the first of the cables.

5. The seating furniture chassis of claim 4, wherein the first peripheral electrical device comprises a first operating device.

6. A method for assembly of a seating furniture chassis of claim 4, the method comprising:
    releasably fastening the back part to the first fastener;
    releasably fastening the side parts to the second fastener;
    establishing an electrical connection between the central electrical device and the first peripheral electrical device such that the central connector is connected to the central electrical device and the individual connector is connected to the first peripheral electrical device.

7. The seating furniture chassis of claim 1, wherein the second side part comprises a second peripheral electrical device comprising a second peripheral connector, wherein the second peripheral connector is electrically connectable to the individual connector of the second of the cables.

8. The seating furniture chassis of claim 7, wherein the second peripheral electrical device comprises a second operating device.

9. The seating furniture chassis of claim 1, wherein the seating furniture chassis comprises a third peripheral electrical device, wherein the third peripheral electrical device is arrangeable in the free space, wherein the third peripheral electrical device comprises a third peripheral connector that is electrically connectable to the individual connector of the third of the cables.

10. The seating furniture chassis of claim 9, wherein the third peripheral electrical device comprises a drive mechanism.

11. The seating furniture chassis of claim 1, wherein the central electrical device is configured to receive first signals from the first peripheral electrical device and/or from the second peripheral electrical device.

12. The seating furniture chassis of claim 11, wherein the central electrical device is configured to emit second signals to the third electrical peripheral device as a function of the first signals.

13. The seating furniture chassis of claim 1, wherein the back part is fastenable to the first fastener with a pivoting movement.

14. The seating furniture chassis of claim 1, wherein the first and second side parts are each fastenable to the second fastener with a pivoting movement.

15. The seating furniture chassis of claim 1, wherein:
    the first fastener comprises a first spring element and a first fastening element,
    the first spring element exerts a first spring force on the first fastening element, and
    the first fastening element is moveable by the back part counter to the first spring force upon fastening of the back part to the first fastener.

16. The seating furniture chassis of claim 15, wherein:
    the first fastener has a latching area, and
    the back part comprises a latching element arranged in the latching area in a fastened state of the back part on the first fastener.

17. The seating furniture chassis of claim 16, wherein the first fastening element, triggered by the first spring force, exerts a latching force on the latching element when the latching element is arranged in the latching area.

18. The seating furniture chassis of claim 16, wherein the latching element is configured to trigger movement of the first fastening element counter to the first spring force.

19. The seating furniture chassis of claim 1, wherein:
- the second fastener comprises a second spring element and a second fastening element,
- the second spring element exerts a second spring force on the second fastening element, and
- the second fastening element is moveable counter to the second spring force upon fastening of one of the first and second side parts to the second fastener.

20. The seating furniture chassis of claim 19, wherein:
- the first and second side parts each comprise a receiving area, and
- the second fastening element is arranged in the receiving area in a fastened state of the first and second side parts on the second fastener and is held in the receiving area by the second spring force.

\* \* \* \* \*